(12) United States Patent
Welford et al.

(10) Patent No.: US 12,316,066 B2
(45) Date of Patent: May 27, 2025

(54) DUAL BEAM SINGLE SPATIAL MODE LASER FOR HANDHELD LIBS INSTRUMENTS AND SIMILAR APPLICATIONS

(71) Applicant: SciAps, Inc., Woburn, MA (US)

(72) Inventors: David Welford, Rockville, MD (US); David R. Day, Boxford, MA (US); Richard P. Mitrano, James Island, SC (US)

(73) Assignee: SCIAPS, INC., Woburn, MA (US)

( * ) Notice: Subject to any disclaimer, the term of this patent is extended or adjusted under 35 U.S.C. 154(b) by 281 days.

(21) Appl. No.: 18/155,892

(22) Filed: Jan. 18, 2023

(65) Prior Publication Data

US 2023/0238766 A1 Jul. 27, 2023

Related U.S. Application Data

(60) Provisional application No. 63/303,565, filed on Jan. 27, 2022.

(51) Int. Cl.
| | |
|---|---|
| *H01S 3/1123* | (2023.01) |
| *G01N 21/25* | (2006.01) |
| *G01N 21/27* | (2006.01) |
| *H01S 3/00* | (2006.01) |
| *H01S 3/06* | (2006.01) |

(Continued)

(52) U.S. Cl.
CPC .......... *H01S 3/1123* (2023.01); *G01N 21/255* (2013.01); *G01N 21/27* (2013.01); *H01S 3/0014* (2013.01); *H01S 3/061* (2013.01); *H01S 3/0621* (2013.01); *H01S 3/0941* (2013.01); *H01S 3/106* (2013.01); *H01S 3/1611* (2013.01); *H01S 3/1643* (2013.01); *G01N 2201/06113* (2013.01)

(58) Field of Classification Search
CPC ...... H01S 3/1123; H01S 3/061; H01S 3/0621; H01S 3/0941; H01S 3/106; H01S 3/1643
See application file for complete search history.

(56) References Cited

U.S. PATENT DOCUMENTS

| | | |
|---|---|---|
| 9,036,146 B2 | 5/2015 | Day |
| 9,356,420 B1 | 5/2016 | Cook et al. |

(Continued)

OTHER PUBLICATIONS

Ralf Bauer, "Output Characteristics of Q-switched Solid-State Lasers Using Intracavity MEMS Micromirrors", 2014 (Year: 2014).*

(Continued)

*Primary Examiner* — Maurice C Smith
(74) *Attorney, Agent, or Firm* — Iandiorio Teska & Coleman, LLP

(57) ABSTRACT

A handheld LIBS device and method includes a laser assembly producing two pulsed single spatial mode output beams and a focusing optic which combines the two pulsed single spatial mode output beams at a focal point at a sample. The laser assembly includes a laser assembly housing with an output coupler window for the two pulsed single spatial mode output beams, a gain medium in the laser assembly housing between the output coupler window and an adjustable prism mount in the laser assembly housing holding a prism configured to establish two light paths through the gain medium, a source in the laser assembly housing providing pump energy to the gain medium, and a Q-switch positioned between the prism and the gain medium.

42 Claims, 9 Drawing Sheets

(51) Int. Cl.
  *H01S 3/0941*  (2006.01)
  *H01S 3/106*   (2006.01)
  *H01S 3/16*    (2006.01)

(56) References Cited

U.S. PATENT DOCUMENTS

| | | |
|---|---|---|
| 9,568,430 B2 | 2/2017 | Day |
| 9,719,853 B2 | 8/2017 | Day et al. |
| 11,079,333 B2 | 8/2021 | Day |
| 2014/0209794 A1* | 7/2014 | Woodruff ............ G01N 21/718 250/226 |
| 2015/0103334 A1 | 4/2015 | Quant et al. |
| 2015/0325971 A1 | 11/2015 | Hirota et al. |
| 2020/0225163 A1 | 7/2020 | Day |

OTHER PUBLICATIONS

Markus Henriksson, "Numerical simulation of a battlefield Nd:YAG laser", 2005 (Year: 2005).*

Molly Fahey, "Ultraviolet Laser Development for Planetary Lander Missions", 2020 (Year: 2020).*

Y.H. Tsang, "Record performance from a Q-switched $Er^{3+}$:$Yb^{3+}$:$YVO_4$ laser", 2009 (Year: 2009).*

Written Opinion of the International Searching Authority for International Application No. PCT/US 23/60865 dated Jun. 26, 2023, eleven (11) pages.

International Search Report of the Patent Cooperation Treaty Application No. PCT/US 23/60865 dated Jun. 26, 2023, two (2) pages.

* cited by examiner

DUAL BEAM SINGLE SPATIAL MODE LASER FOR HANDHELD LIBS INSTRUMENTS AND SIMILAR APPLICATIONS

RELATED APPLICATIONS

This application claims benefit of and priority to U.S. Provisional Application Ser. No. 63/303,565 filed Jan. 27, 2022, under 35 U.S.C. §§ 119, 120, 363, 365, and 37 C.F.R. § 1.55 and § 1.78, which is incorporated herein by this reference.

FIELD OF THE INVENTION

This invention relates to lasers used, for example, in handheld LIBS analyzers.

BACKGROUND OF THE INVENTION

Laser-induced breakdown spectroscopy (LIBS) devices are used to detect the presence and concentrations of elements in a sample. LIBS devices include a laser that sufficiently heats a portion of the sample to produce a plasma. As the plasma cools, the electrons return from higher energy excited states to lower energy states. In the process, photons are emitted at wavelengths unique to the specific elements of the sample. See U.S. Pat. No. 9,719,853 incorporated herein by this reference.

For handheld LIBS analyzers, desired by many users for field work, the laser and electronics subsystems are battery powered. Thus, lower power lasers are typically used as compared to typical laboratory instrumentation. The small lasers used in handheld LIBS instrumentation are typically less than 12 mJ and multimode in operation. Multimode operation often leads to a lower power density at the focus of the laser beam and also shot-to-shot power variations as mode hops occur. Both of these factors contribute to a lower signal-to-noise ratio and lower stability over multi-pulse data collection.

SUMMARY OF THE INVENTION

Featured in one example is a battery-powered handheld LIBS device with a new laser assembly producing a pulsed single mode dual laser beam that can be focused to higher energy densities and with more shot-to-shot consistency than multimode lasers. The higher focused energy density and shot-to-shot reproducibility provide the ability to detect lower concentrations of certain elements and/or elements which could not be detected by multimode lasers of similar pulse power.

Also featured in some embodiments is such a laser assembly which is sufficiently compact and rugged for field use, which is stable, which is more tolerant of any misalignment of the internal optical components.

In some aspects, a new laser assembly is designed so certain optical components can be easily adjusted for optimum alignment.

The subject invention, however, in other embodiments, need not achieve all these objectives and the claims hereof should not be limited to structures or methods capable of achieving these objectives.

Featured is a handheld LIBS device comprising a laser assembly including a housing and an optical resonator subsystem in the housing. The resonator subsystem includes a gain medium and a prism which is configured to establish two light paths through the gain medium and a Q-switch positioned to intercept the two light paths. A source in the housing provides pump energy to the gain medium to direct light to the prism which redirects light along the two light paths through the gain medium and redirected back through the gain medium until two TEM00 spatial mode pulsed laser output beams are produced. A focusing optic combines the two pulsed laser output beams at a focal point.

In some examples, the prism is a Porro prism, and the source is a diode laser. The preferred device further includes an output coupler. In one example, an end of the gain medium is coated to serve as the output coupler. The output coupler can be positioned so the gain medium is located between the output coupler and the prism. In one example, the gain medium is a hemispherical rod. The gain medium may be composed of Nd-YAG and the source is preferably oriented to side pump the gain medium. In one example, the Q-switch is a passive Cr-YAG Q-switch.

The device may further include a prism mount adjustable relative to the housing. One preferred prism mount is adjustable in tilt and is adjustable laterally. In some examples, the gain medium and the source are fixed in place in the housing.

The device may further include a detector in the housing for detecting when the laser assembly pulses such as a photodiode positioned to collect energy emitted from the gain medium.

In one example, the output coupler is located in a wall of the housing. A Q-switch mount is preferably adjustable relative to the housing, for example, the Q-switch mount is rotatable relative to the housing. The Q-switch, in some examples, is located between the gain medium and the prism or between the gain medium and an output coupler.

A spectrometer subsystem, in one example, is responsive to plasma radiation at or proximate the focal point and configured to detect sample element wavelengths.

Also featured is a handheld LIBS device comprising a laser assembly including a housing, and a resonator subsystem in the housing. The preferred resonator subsystem includes a gain medium, a prism, a Q-switch between the prism and the gain medium or positioned between the gain medium and an output coupler, and a source in the housing providing pump energy to the gain medium to provide two spaced pulsed laser output beams. A focusing optic converges the two spaced laser output beams at a focal point and a spectrometer subsystem is responsive to plasma radiation and is configured to detect sample element wavelengths.

Also featured is a new laser assembly comprising: a gain medium; a prism configured to establish two spaced light paths through the gain medium; a Q-switch positioned to intercept the two light paths; and a source providing pump energy to the gain medium to direct light to the prism which redirects light along the two light paths through the gain medium and redirected back through the gain medium until two spaced pulsed laser output beams are produced.

A new method of providing a higher power density laser beam at a focal point includes providing pump energy to a gain medium; directing light from the gain medium to a prism which redirects light along the two spaced light paths back through the gain medium; redirecting the light back through the gain medium along the two spaced light paths; producing two spaced TEM00 spatial mode pulsed laser output beams; and combining the two spaced laser output beams at the focal point.

A new handheld LIBS device includes a laser assembly producing two pulsed single spatial mode output beams, a focusing optic which combines the two pulsed single spatial mode output beams at a focal point at a sample, and a spectrometer subsystem responsive to plasma radiation at or proximate the focal point and configured to detect sample element wavelengths. The laser assembly includes a laser assembly housing with an output coupler window for the two pulsed single spatial mode output beams, a gain medium in the laser assembly housing between the output coupler window and an adjustable prism mount in the laser assembly housing holding a prism configured to establish two light paths through the gain medium, a source in the laser assembly housing providing pump energy to the gain medium, and a Q-switch positioned between the prism and the gain medium.

A new method of providing a higher power density laser beam at a focal point includes providing pump energy to a gain medium; directing light from the gain medium to a prism which redirects light along the two spaced light paths back through the gain medium; redirecting the light back through the gain medium along the two spaced light paths; producing a single TEM01 or TEM10 spatial mode pulsed laser output beam with two lobes; and combining the two lobes at the focal point.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
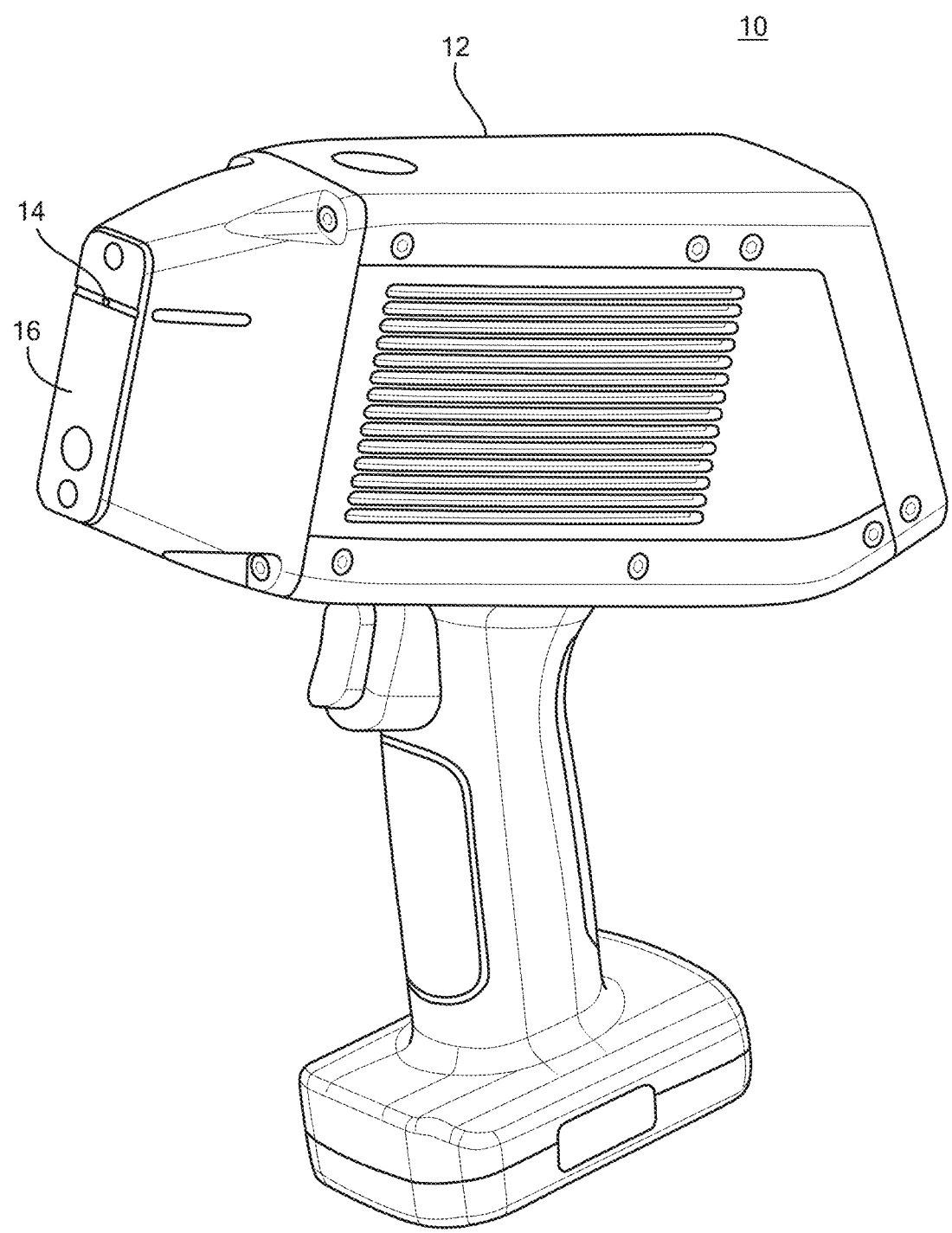
FIG. 1 is a schematic view showing an example of a handheld LIBS analyzer in accordance with one example.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
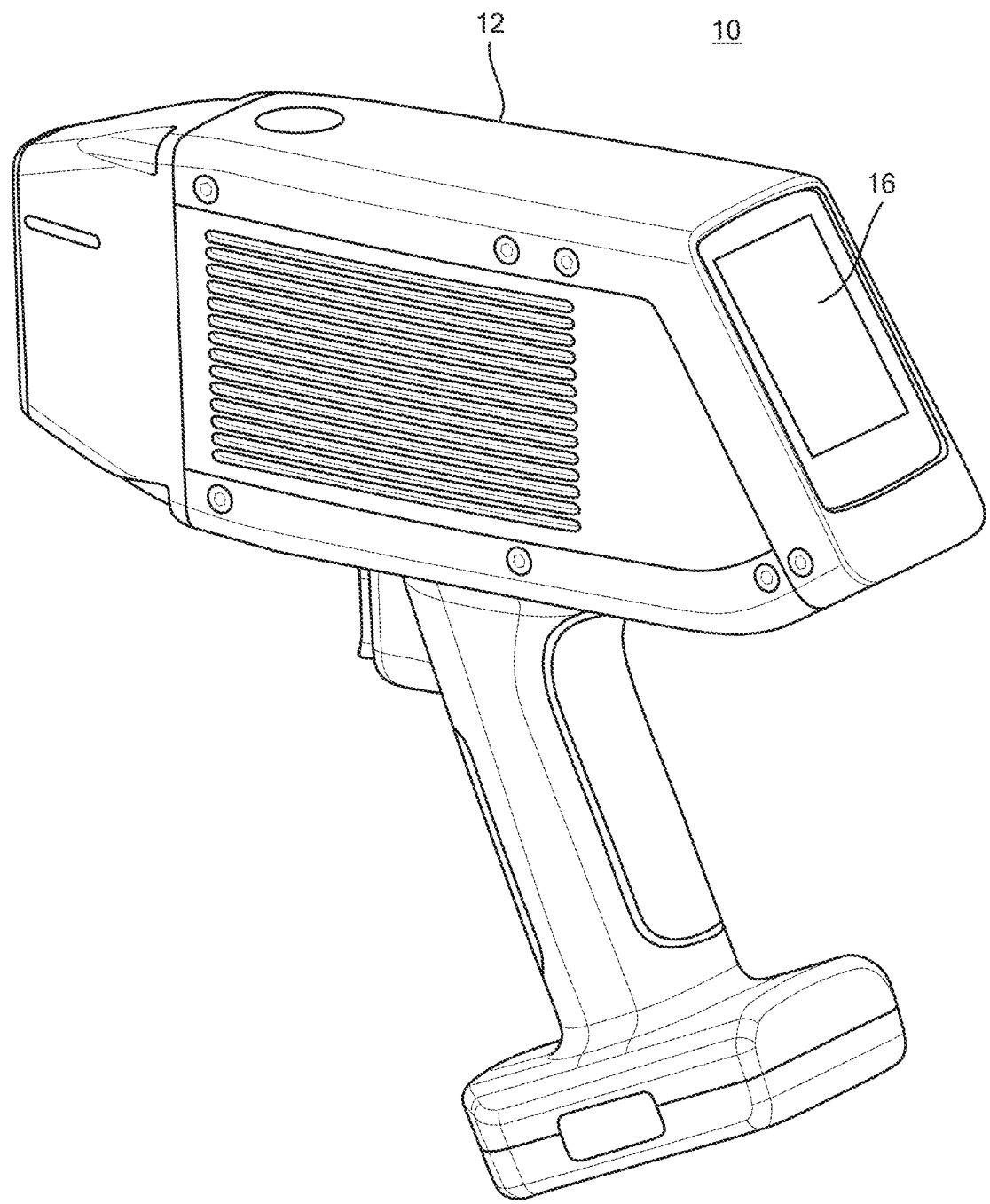
FIG. 2 is a schematic rear view showing the display screen of a handheld LIBS analyzer of FIG. 1.
Figure 3:
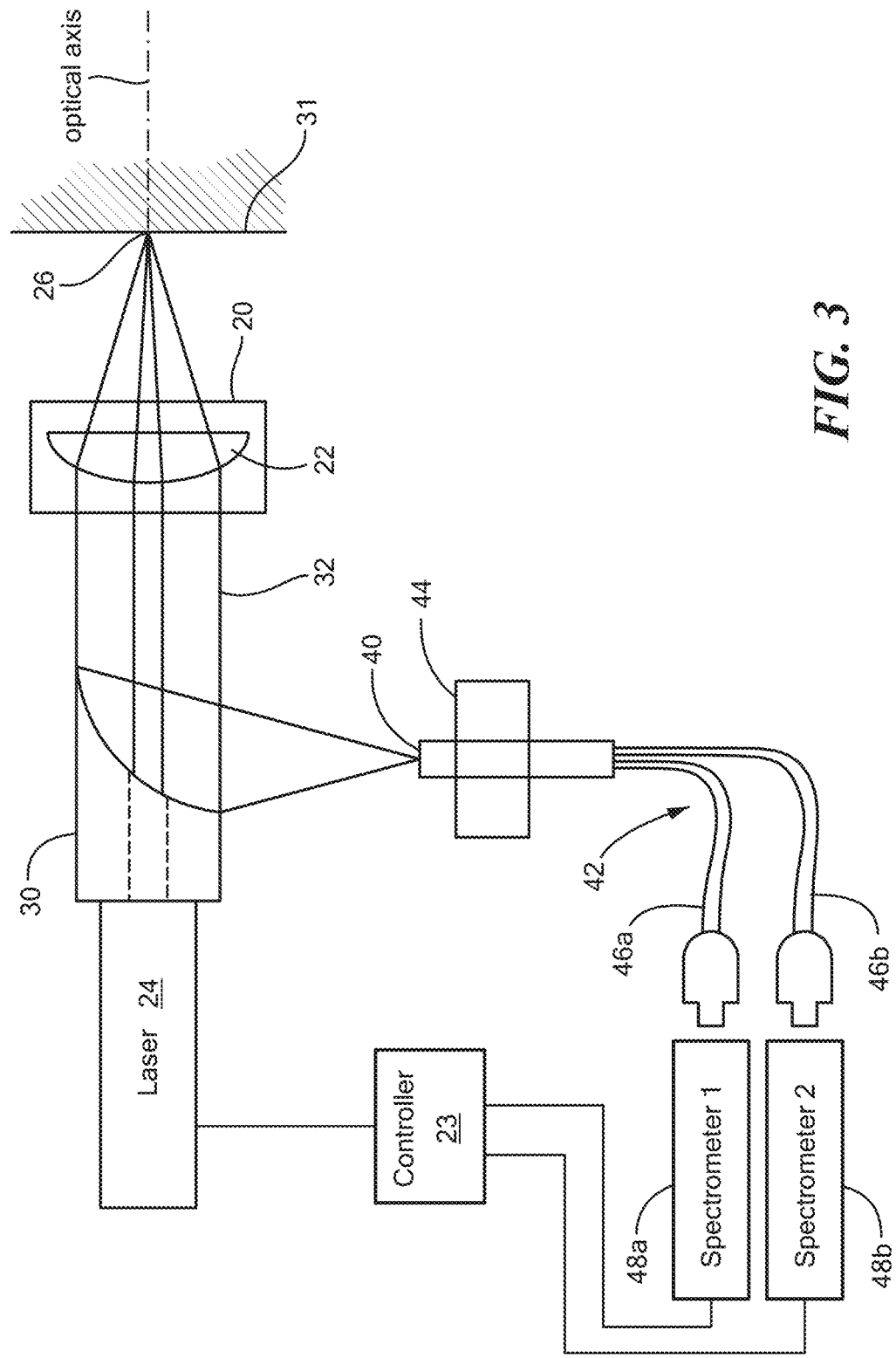
FIG. 3 is a schematic block diagram showing the primary components associated with a handheld LIBS analyzer in accordance with one example.

Handheld LIBS analyzer 10, FIG. 1, preferably includes an outer housing 12 enclosing a laser assembly, one or more spectrometers, various optics, optical stages, processors, and the like as discussed below. The laser energy exits orifice 14 in end plate 16. The resulting plasma created on a sample abutting end plate 16 is automatically analyzed and results are displayed on screen 16, FIG. 2. See U.S. Pat. No. 11,079,333 incorporated herein by this reference. In one exemplary design, optic stage 20, FIG. 3 is moveable with respect to the instrument housing and includes laser focusing lens 22.

Laser assembly 24 is preferably mounted in the outer housing and is preferably configured to direct two spaced laser beams to a sample through the aperture in apertured off axis parabolic mirror 30 and to adjustable focusing lens 22 which then combines the two spaced laser beams at a focal point 26 on or within sample 31. Plasma radiation 32 may be directed back though focusing lens 22 and can then be directed by mirror 30 to the common end 40 of a fiber optic bundle 42. Common end 40 of fiber optic bundle 42 may be mounted within the instrument housing using an adjustable alignment mount or clamp 44. One or more branches 46a, 46b of the fiber optic bundle are connected to a spectrometer subsystem such as spectrometers 48a, 48b, respectively. Each branch preferably includes multiple fibers but may, in some designs, only include one fiber. Additional spectrometers and branches are possible. Alternative radiation collection optic designs that are independent of the laser delivery optics are also possible. See U.S. Pat. Nos. 9,568,430 and 9,036,146 incorporated herein by this reference.

As noted, preferably, the laser assembly produces two pulsed laser beams physically spaced apart from each other geometrically (i.e., in space as opposed to in time) and lens 22, FIG. 3 combines the two beams at a focal point (which typically is located at the surface of sample 31 or slightly below the surface of the sample) to create a plasma.

Figure 4:
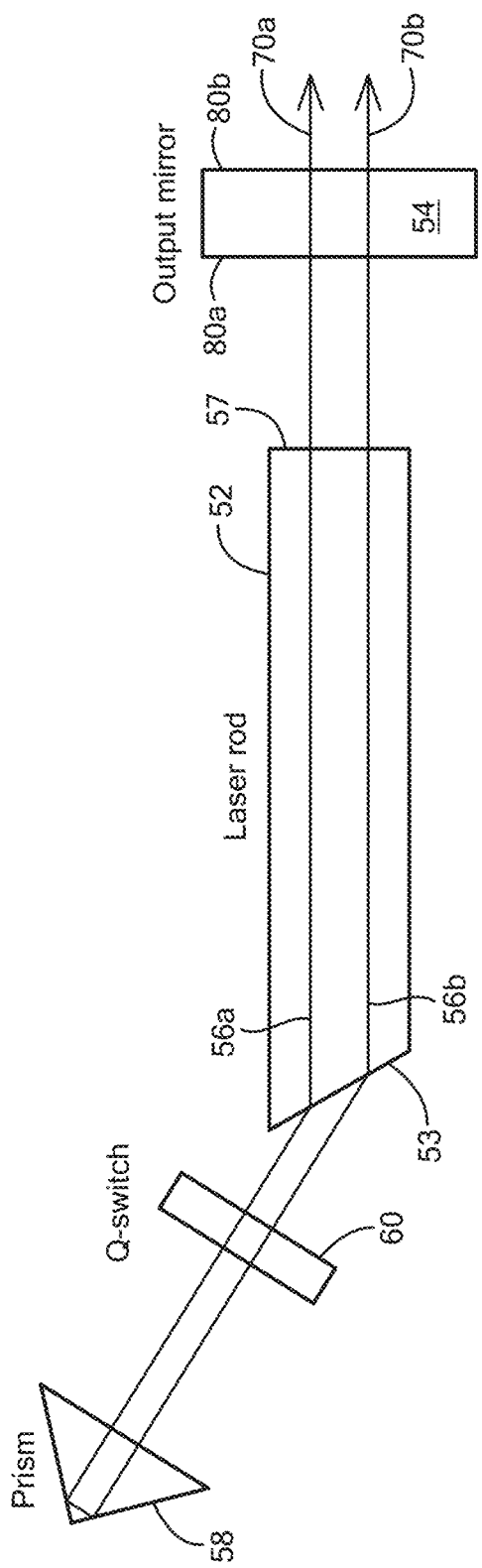
FIG. 4 is a top view showing the primary components of a laser subassembly in one example.
Figure 5:
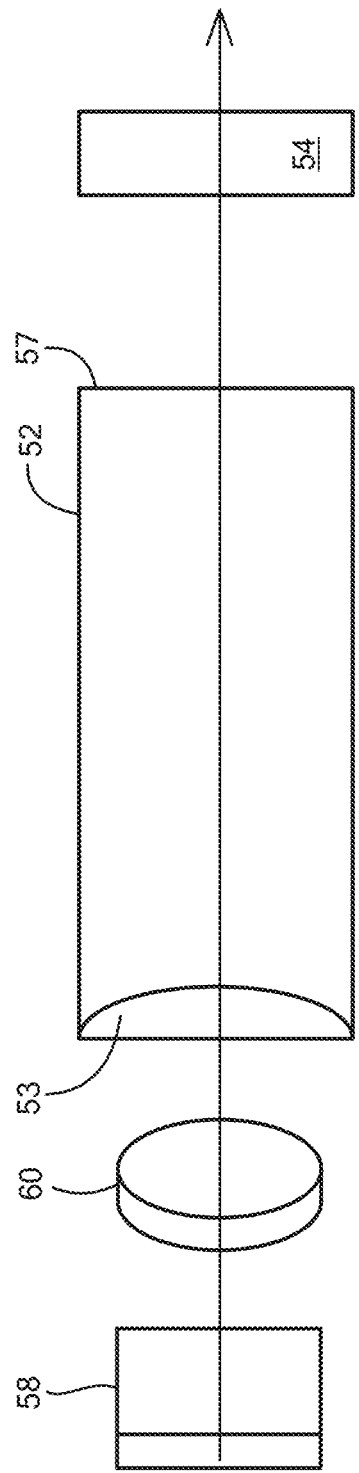
FIG. 5 is a side view of the laser subassembly of FIG. 4.
Figure 6:
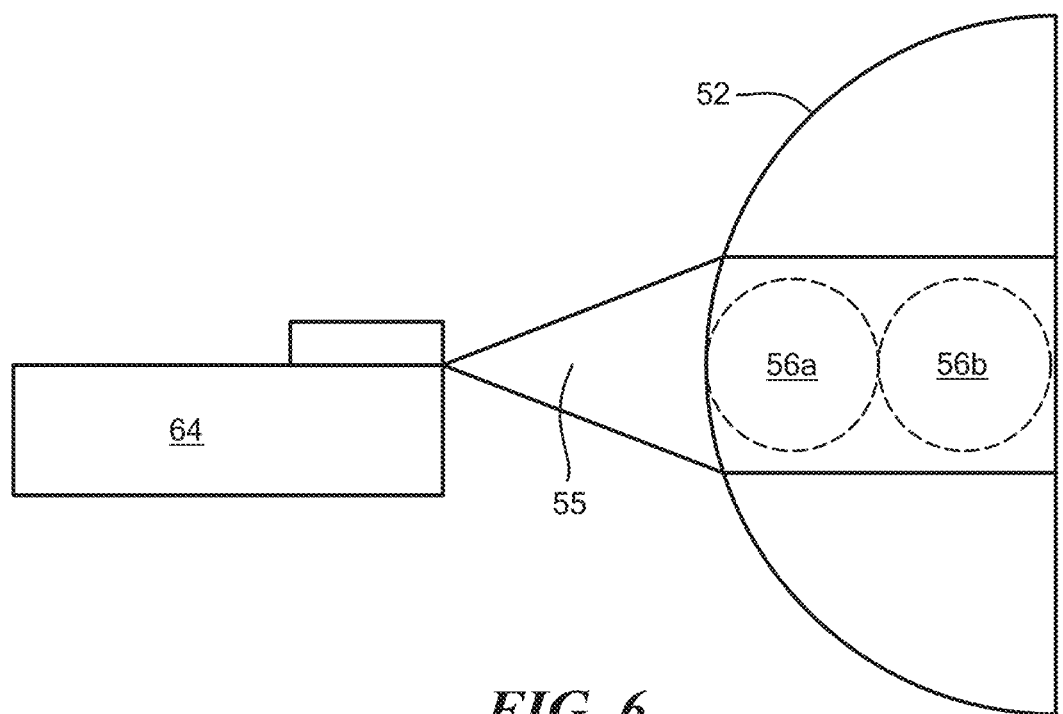
FIG. 6 is an illustration showing a diode laser pumping the curved surface of the hemicylindrical gain medium with the two dashed circles showing the spatial overlap of the $TEM_{00}$ mode within the pumped region of the gain medium for the two beam paths traversing the length of the gain medium.

In one particular example, the laser assembly includes a housing enclosing a resonator subsystem which includes a gain medium such as a Nd-YAG hemicylindrical rod 52, FIGS. 4-6. Preferably, hemispherical rod 52 is exactly half a round rod. However, other configurations are possible. Proximal end 53, FIG. 4 of hemicylindrical rod 52 is preferably cut at a Brewster angle and distal end 57 is preferably flat and normal to the optical axis with either an anti-reflective coating or a partially reflective mirror coating. If rod end 57 is antireflective, then output window 54 has a partially reflective coating and serves as the laser output coupler (see FIGS. 4 and 5). If rod end 57 has a partially reflective mirror coating, then the rod end itself can serve as the laser output coupler and window 54 may have anti-reflective coatings at the laser wavelength. If an antireflective coating or no coating is used on rod end 57, that surface could also be cut at a Brewster angle with all the component orientations being adjusted appropriately.

Figure 7:
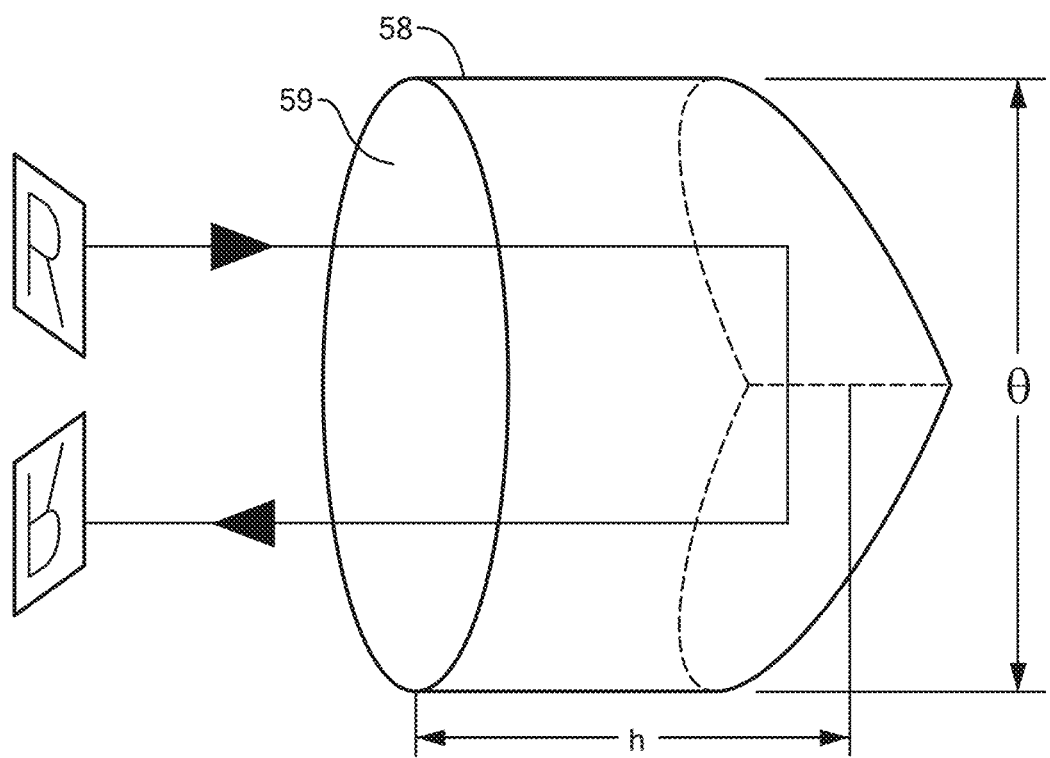
FIG. 7 is a schematic view of an example of a suitable prism.
Figure 8B:
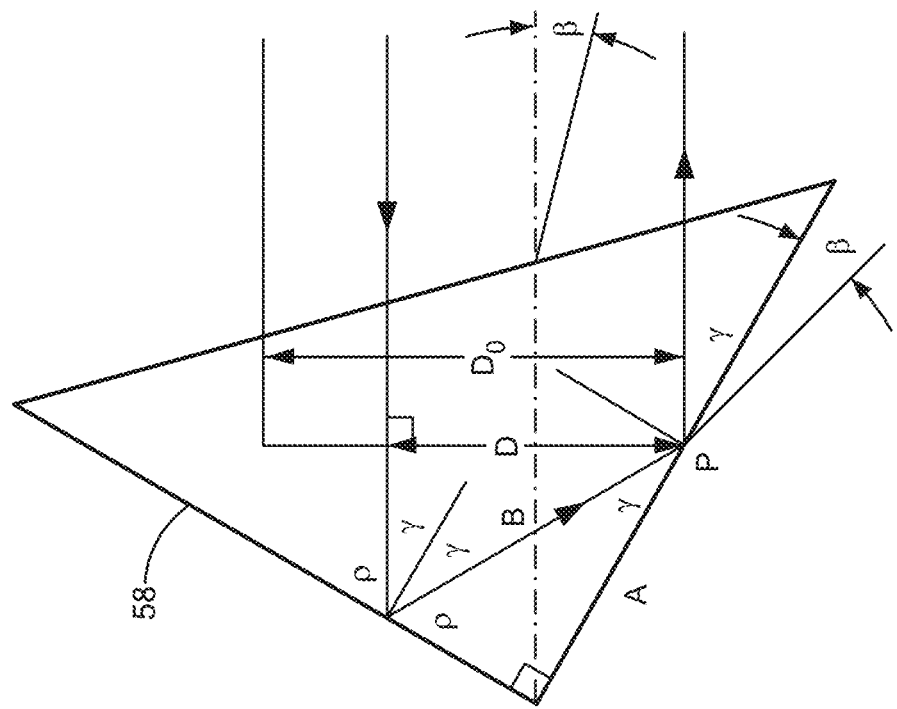
FIGS. 8A-8B illustrate how the prism is insensitive to misalignment.
Figure 8A:
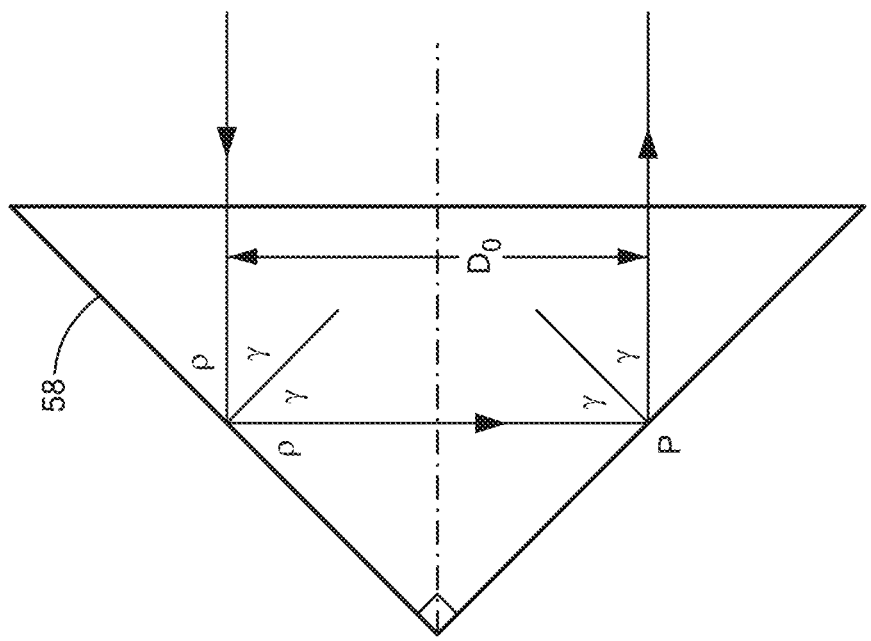

Preferably, the gain medium is disposed between window 54 (which, for example, serves as an output coupler 54) and prism 58 which is configured to establish two spaced light paths 56a, 56b through the gain medium. As shown in FIG. 7 a knife edge right angle prism mirror 58 (e.g., a Porro prism) may be used. A Q-switch optic 60, FIGS. 4-5 is preferably positioned between prism 58 and gain medium 52 to intercept the two spaced light paths. In one preferred example, the Q-switch optic 60 may be a passive Cr-YAG Q-switch. In another example, the Q-switch is located between the gain medium 52 and window 54. In such a design, preferably window 54 serves as an output coupler. In another design, the Q-switch may be an active Q-switch.

A source 64 (e.g., a diode laser with one or more rows of linearly spaced emitters) provides pump energy to gain medium 52. Preferably, source 64 side pumps hemicylindrical rod 52 with laser excitation energy 55. See FIG. 6.

While not wishing to be bound by any particular theory, it is believed light is directed to prism 66, FIG. 4 which redirects the light along two spaced (e.g., side by side) light paths 56a, 56b through the gain medium to be redirected by the output coupler back through the gain medium and to the prism and so on until the Q-switch is saturated or otherwise stops attenuating or switches states and, as a result, two physically spaced (i.e., side by side) pulsed laser output beams 70a, 70b are produced which exit through output coupler 54. In one design, output coupler 54 preferably has a partially reflective rear coating 80a and an antireflective front coating 80b both at the laser output wavelength. In other designs, optic 54 is a window and the output coupler is formed on the end 57 of gain medium 52.

The result is efficient extraction of deposited energy from the gain medium into two diffraction limited, high-brightness, side-by-side $TEM_{00}$ spatial mode beams. The use of the Porro prism to fold the resonator beam path provides two passes of the gain medium pumped region thereby improving energy extraction in the $TEM_{00}$ mode while lowering stored energy in the higher order spatial modes to prevent them from lasing.

The Porro prism also preferably exhibits angular insensitivity in the beam folding plane which is aligned with the pumping beam direction in the gain medium to compensate for the small angle light deflection within the gain medium due to pump beam induced thermal gradients that change as the diode laser pump wavelength and associated absorption temperature tune. The folded resonator geometry preferably doubles the resonator length without extending the laser package size and the double beam results in a larger $TEM_{00}$ mode size better matched to fill the laser rod pumped region. Adjustment of the laser resonator length and gain medium clear aperture in relation to one another preferably adjusts the $TEM_{00}$ mode size to fill one half of the gain medium smallest lateral dimension thereby only allowing low loss transmission of the desired $TEM_{00}$ mode through the gain medium aperture. High-order spatial modes experience sufficient apodization loss in the gain medium to prevent lasing.

A plano output mirror 54 for the two beam paths in the resonator rod preferably generates a pair of parallel spaced output beams thereby ensuring their spatial overlap in the focal plane when focused with a lens (e.g., lens 22, FIG. 3) onto sample 31.

The preferred hemicylindrical gain medium cross-section collimates the divergent diode laser pump light (from the fast-axis of the emission) with the cylindrical surface and reflection of the pump light with the rear flat surface to double the pump beam path thereby maximizing pump light absorption. See D. Welford, D. M. Rines, and B. J. Dinerman, "Efficient TEM00-mode Operation of a Laser-Diode Side-Pumped Nd:YAG Laser," Optics Lett., 16, 1850 (1991); D. Welford, D. M. Rines, and B. J. Dinerman, "Observation of Thermal Lensing Due to Near-Gaussian Pump Energy Deposition in A Laser-Diode Side-Pumped Nd:YAG Laser," IEEE J. Quantum Electron. QE-28, 1075 (1992); Y. Isyanova and D. Welford, "2.4-ns pulse generation in a solid-state passively Q switched laser-diode-pumped Nd:YAG laser," in OSA Proceedings on Advanced Solid State Lasers (OSA Proceedings Vol. 15, Optical Society of America, Washington, D.C.) paper AMB2 (1993); and Q. Lu and J. Eicher. "Off-axis prism resonator for improved beam quality of slab lasers," Opt. Letts., 15, 1357 (1990).

The ability to laterally displace the beams in the laser resonator by tilting the Q-switch about its axis parallel to the knife edge of the Porro prism may result in a means to fine tune the resonator alignment in the beam folding plane of the resonator.

In some embodiments, prism 58, FIG. 7 is preferably a single 90 degree apex prism where the apex has a knife edge finish, i.e. there are minimal chips or defects along the apex, and it is used to retroreflect an optical beam in one plane and one plane only. The prism may have a circular entrance/exit surface 59 shown in FIG. 7 or it may have any other shape (rectangular for example) as long as the edges are clear from the laser beams. The entrance face may have an anti-reflective coating at the laser wavelength. The two reflection faces are preferably uncoated. The preferred prism orientation is indicated in FIG. 4 to maximize energy extraction from the gain medium, however other prism rotation angles around the optical axis are possible.

Because of the better beam quality (one TEM mode 00), the same energy beam can be focused by (e.g., by external lens 22, FIG. 3) to a tighter, smaller spot at the lens focus yielding a higher power density at the focus on sample 31. LIBS signals depend on power density and thus larger LIBS emission lines are produced.

Figure 9:
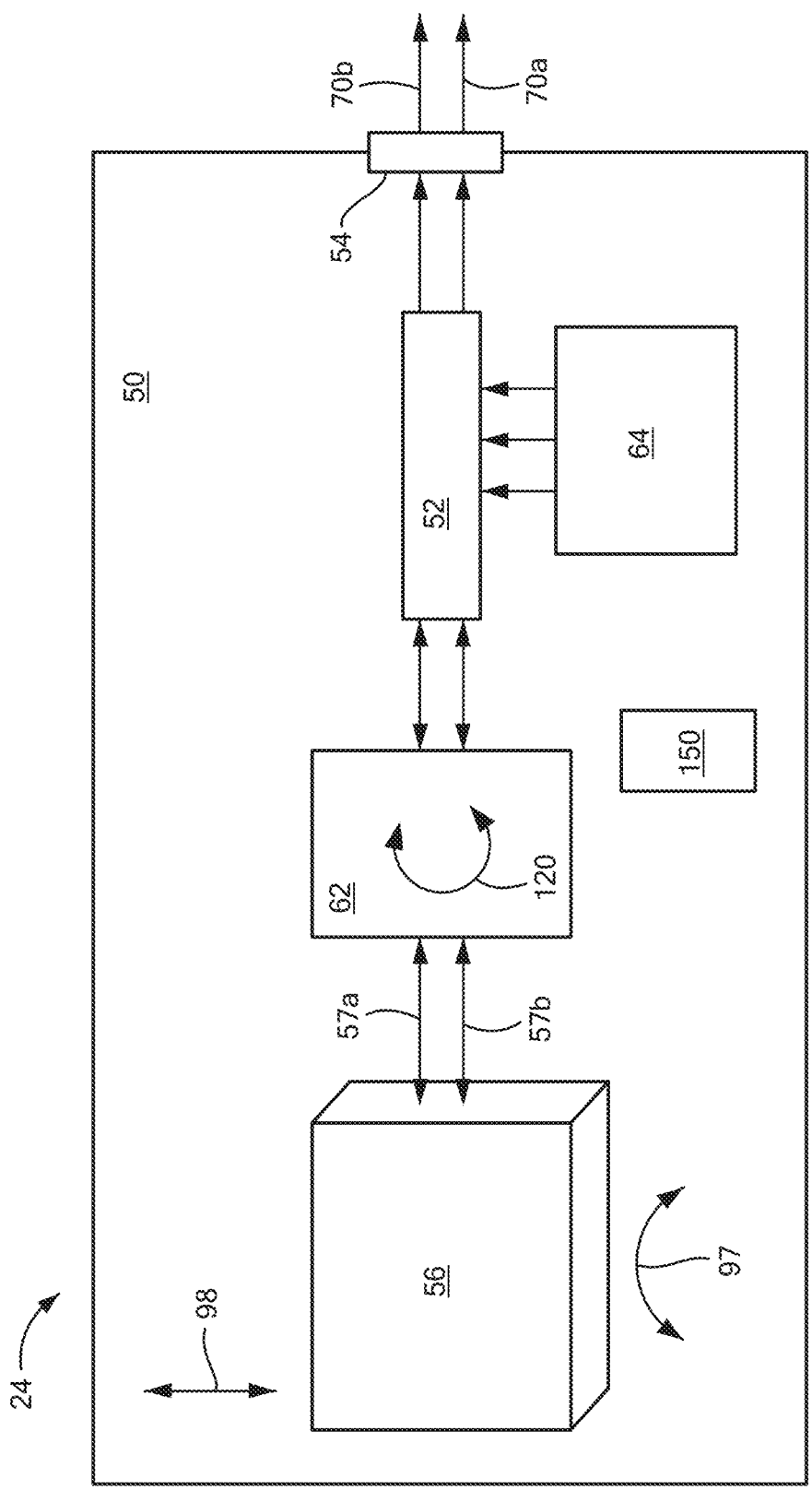
FIG. 9 is a schematic view showing the primary components associated with one preferred laser assembly.

FIG. 9 shows an example of a laser assembly 24 within housing 50 and the various optical components and mounts secured to housing 50.

In one version, prism housing 56 is adjustable in tilt (as shown at 97). The prism is preferably adjustable in tilt in the plane defined by the optical axis and the prism knife edge. The prism is preferably configured to reflect an incident beam directly back in the direction from whence it came. So, by changing the tilt angle of the prism, the reflected beam can be adjusted to be exactly normal to the output coupler surface. The prism can be conveniently adjusted during final assembly and testing.

Prism mount 56 can also be adjusted laterally in the direction of arrow 98 (i.e., in a direction normal to the plane defined by the optical axis and the prism knife edge). A lateral adjustment of prism mount 56 adjusts the distance between the two light paths 57a, 57b. Instead of translating the prism in the plane of the housing, it could also tilt it around an axis not coincident with the knife edge. This is equivalent to a combined translation and tilt adjustment. Preferably, there is insensitivity to tilt in the plane of the housing (basically insensitivity to small rotations around the knife edge).

Normally, a typical Q-switch would be oriented perpendicular to the beam incident on it. But here, in order to fine tune the spacing between the two light paths, Q-switch housing 62 is preferably rotatable about axis 120. The passive Q-switch is preferably a thin disk of Cr:YAG with flat and nominally parallel optical surfaces aligned at or near to normal incidence relative to the laser beam path. However, rotating the Q-switch about its vertical axis results in very small lateral displacement of the beam between the laser rod and the prism which is analogous to the lateral translation of the prism used to align the laser resonator. The extremely small beam translation attained by adjusting the Q-switch rotation is used to fine tune the laser alignment after the much coarser prism translation mechanism has been locked in place.

High speed photodiode/filter assembly 150 can be used to detect when the gain medium pulses the two laser beams. For the example of a Nd-YAG gain medium, a silicon-based photodiode can be used to sense the laser pulse wavelength (e.g. 1064) while rejecting the 808 nm pump diode light through use of an appropriate filter located in front of the photodiode within the photodiode assembly. The signal from the photodiode can be adjusted to a desired magnitude by rotating the assembly toward or away from the gain medium. The photodiode can thus be used to detect the laser pulse and, in response, a controller can then stop the source 64 from pumping the gain medium in order to protect the pump source from overheating as well as to conserve battery power. Controller 23, FIG. 3 is configured (e.g., programmed) to, among other things, control laser 24 and to process the outputs of the spectrometer(s).

Figures 10A, 10B, 10C, 10D:
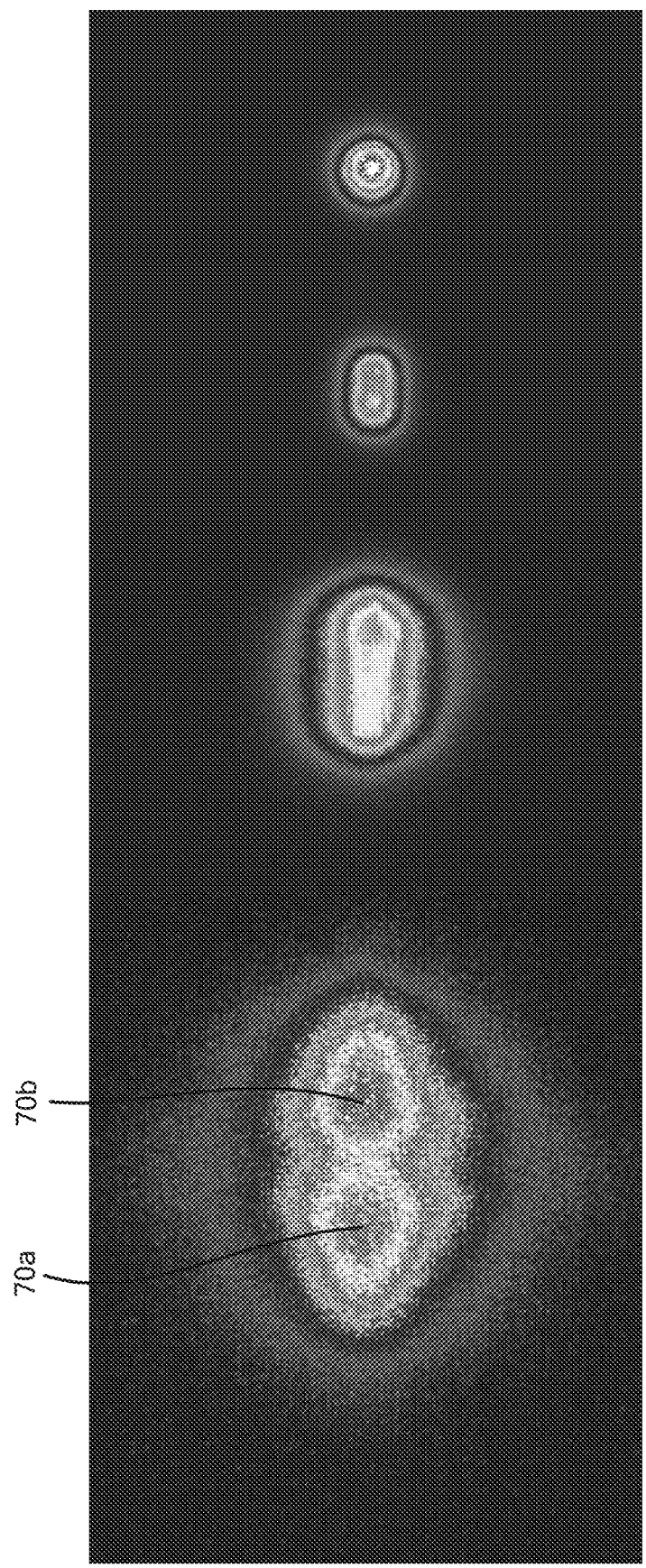
FIGS. 10A-10D are views of the two emitted beams cross sectional intensity profile at the laser exit window (FIG. 10A) and then as it is focused down to minimum spot size (FIG. 10D)

An example of the dual beam 70a, 70b output profile is shown in FIG. 10A along with several profiles as is the beams are focused (FIGS. 10B-10C) down to minimum spot size (FIG. 10D).

Figure 11:
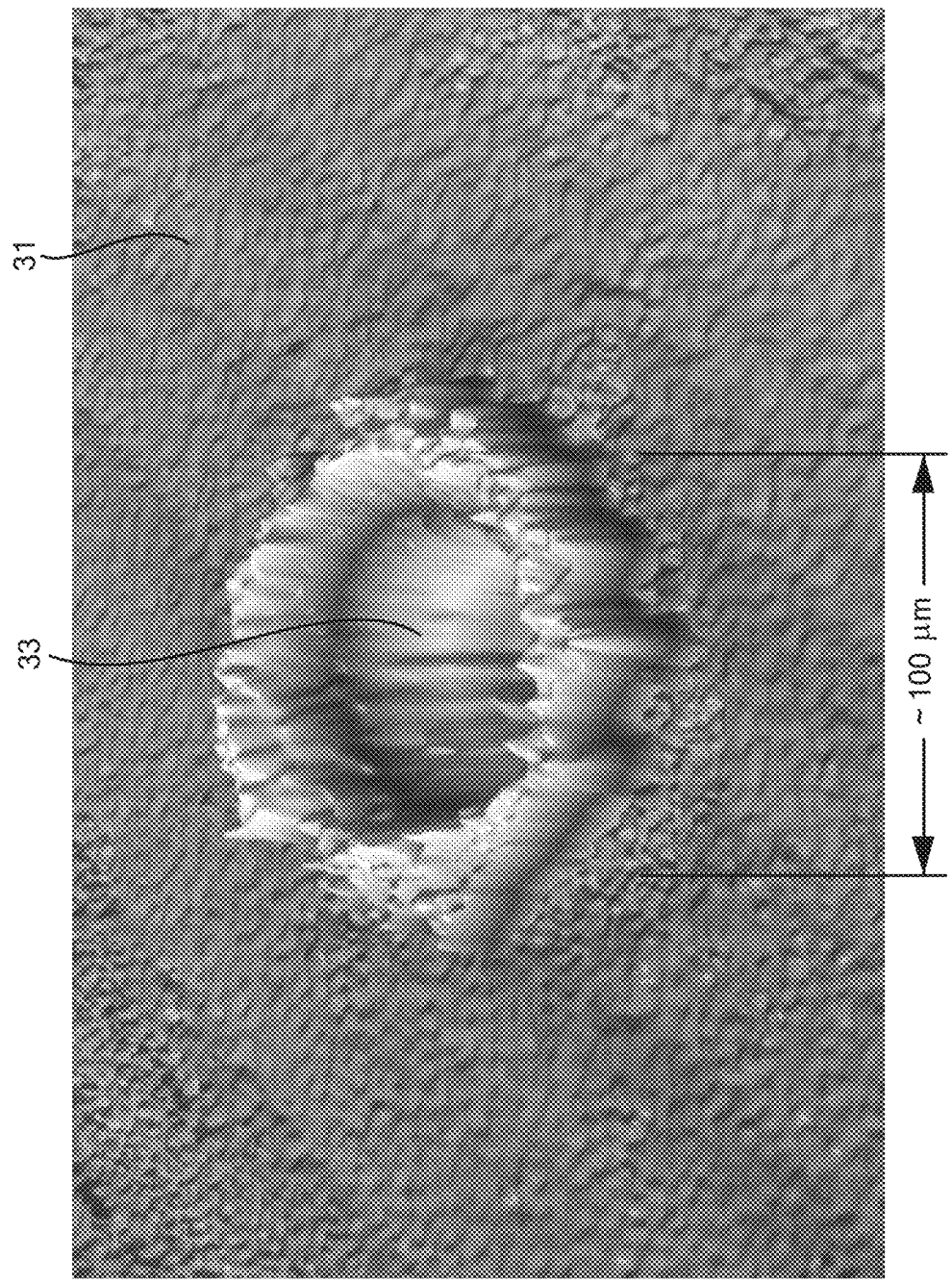
FIG. 11 is an example of a circular crater (approximately 100 μm rim to rim) created in an aluminum sample after 128 laser shots using the laser subassembly described herein.

FIG. 11 depicts an example of a circular crater 33 created in an aluminum sample 31 after 128 focused laser shots.

The preferred laser assembly provides two coherent, high quality laser beams which can be combined to converge at a small spot on or in the sample to produce a plasma brighter than known handheld LIBS devices because of the higher laser energy density at the focused spot on or in the sample. Because of the better beam quality (e.g., one $TEM_{00}$ mode), the same energy beam can be focused by (e.g., by lens 22, FIG. 3) to a tighter, smaller spot at the lens focus yielding a higher power density at the focus on sample 31. LIBS signals depend on power density and thus larger LIBS emission lines are produced.

In one example, five times the carbon signal strength was detected by the spectrometer subsystem which allows the classification of many different metals such as different grades of stainless steel.

The ability to adjust the optical components during final assembly and testing as described herein allows for fine tuning of the spacing between the two light paths through the optics and for matching the prism reflection angle with the orientation of the output coupler so they are parallel or nearly parallel to each other. Prism tilt and prism translation are possible, the latter of which can be fine-tuned with Q switch rotation.

And yet, the laser assembly does not consume a large amount of power and can be battery powered which is useful in handheld devices used in the field.

The prism preferably improves ease of alignment. The dual light paths through the gain medium may result in a more efficient energy extraction. And, the preferred laser assembly is tolerant to some misalignment and is also rugged in design.

Also featured is a new method of providing a higher power density laser beam at a focal point. The method may include providing pump energy to a gain medium, directing light from the gain medium to a prism which redirects light along the two spaced light paths back through the gain medium, and redirecting the light back through the gain medium along the two spaced light paths. A single $TEM_{01}$ or $TEM_{10}$ spatial mode pulsed laser output beam is produced with two lobes. The two lobes are combined at the focal point.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A handheld LIBS device comprising:
   a laser assembly including:
      a housing,
      an optical resonator subsystem in the housing including:
         a gain medium and a prism which is configured to establish two light paths through the gain medium, and
         a Q-switch positioned to intercept the two light paths,
      a source in the housing providing pump energy to the gain medium to direct light to the prism which redirects light along the two light paths through the gain medium and redirected back through the gain medium until two $TEM_{00}$ spatial mode pulsed laser output beams are produced or a single $TEM_{01}$ or $TEM_{10}$ spatial mode pulsed laser output beam with two lobes is produced;
   a focusing optic which combines the two pulsed laser output beams or two lobes at a focal point; and
   a spectrometer subsystem responsive to plasma radiation at or proximate the focal point and configured to detect sample element wavelengths.

2. The device of claim 1 in which the prism is a Porro prism.

3. The device of claim 1 in which the source is a diode laser.

4. The device of claim 1 further including an output coupler.

5. The device of claim 4 in which an end of the gain medium is coated to serve as the output coupler.

6. The device of claim 4 in which the output coupler is positioned so the gain medium is located between the output coupler and the prism.

7. The device of claim 1 in which the gain medium is a hemispherical rod.

8. The device of claim 1 in which the gain medium is composed of Nd-YAG and the source is oriented to side pump the gain medium.

9. The device of claim 1 in which the Q-switch is a passive Cr-YAG Q-switch.

10. The device of claim 1 further including a prism mount adjustable relative to the housing.

11. The device of claim 10 in which the prism mount is adjustable in tilt.

12. The device of claim 10 in which the prism mount is adjustable laterally.

13. The device of claim 1 in which the gain medium and the source are fixed in place in the housing.

14. The device of claim 1 further including a detector in the housing for detecting when the laser assembly pulses.

15. The device of claim 14 in which the detector is a photodiode positioned to collect energy emitted from the gain medium.

16. The device of claim 6 in which the output coupler is located in a wall of the housing.

17. The device of claim 1 further including a Q-switch mount adjustable relative to the housing.

18. The device of claim 16 in which the Q-switch mount is rotatable relative to the housing.

19. The device of claim 1 in which the Q-switch is located between the gain medium and the prism or between the gain medium and an output coupler.

20. A laser assembly comprising:
a gain medium;
a prism configured to establish two spaced light paths through the gain medium;
a Q-switch positioned to intercept the two light paths;
a source providing pump energy to the gain medium to direct light to the prism which redirects light along the two light paths through the gain medium and redirected back through the gain medium until two spaced pulsed laser output beams are produced or a single $TEM_{01}$ or $TEM_{10}$ spatial mode pulsed laser output beam with two lobes is produced.

21. The assembly of claim 20 in which the prism is a Porro prism.

22. The assembly of claim 20 in which the source is a diode laser.

23. The assembly of claim 20 in which the gain medium is composed of Nd-YAG and the source is oriented to side pump the gain medium.

24. The assembly of claim 20 in which the Q-switch is a passive Cr-YAG Q-switch.

25. The assembly of claim 20 further including a prism mount adjustable relative to the housing.

26. The assembly of claim 20 further including a detector in the housing for detecting when the laser assembly pulses.

27. The assembly of claim 20 further including a Q-switch mount adjustable relative to the housing.

28. A method of providing a higher power density laser beam at a focal point, the method comprising:
providing pump energy to a gain medium;
directing light from the gain medium to a prism which redirects light along the two spaced light paths back through the gain medium;
redirecting the light back through the gain medium along the two spaced light paths;
producing two spaced $TEM_{00}$ spatial mode pulsed laser output beams or a single $TEM_{01}$ or $TEM_{10}$ spatial mode pulsed laser output beam with two lobes; and
combining the two spaced laser output beams or two lobes at the focal point.

29. The method of claim 28 in which the prism is a Porro prism.

30. The method of claim 28 in which the source is a diode laser.

31. The method of claim 28 in which the gain medium is an Nd-YAG laser rod and the source is oriented to side pump the rod.

32. The method of claim 28 in which producing two pulsed laser output beams includes employing a Q-switch to intercept the two light paths.

33. The method of claim 32 in which the Q-switch is a passive Cr-YAG Q-switch.

34. The method of claim 28 further including adjusting the prism relative to the housing.

35. The method of claim 28 further including detecting when the laser assembly pulses.

36. The method of claim 32 further including adjusting the Q-switch relative to the housing.

37. The method of claim 32 in which the Q-switch is located between the gain medium and the prism.

38. A handheld LIBS device comprising:
an outer housing including:
a laser assembly producing two pulsed single spatial mode output beams or a single pulsed laser output beam with two lobes,
a focusing optic which combines the two pulsed single spatial mode output beams or two lobes at a focal point at a sample, and
a spectrometer subsystem responsive to plasma radiation at or proximate the focal point and configured to detect sample element wavelengths; and
the laser assembly including:
a laser assembly housing a window,
a gain medium in the laser assembly housing between the output coupler window and an adjustable prism mount in the laser assembly housing holding a prism configured to establish two light paths through the gain medium,
a source in the laser assembly housing providing pump energy to the gain medium, and
a Q-switch positioned between the prism and the gain medium.

39. The handheld LIBS device of claim 38 in which the Q-switch is held in an adjustable Q-switch mount in the laser assembly housing.

40. The LIBS device of claim 38 in which the gain medium is composed of Nd-YAG and the source is oriented to side pump the gain medium.

41. The handheld LIBDS device of claim 38 in which the Q-switch is a passive Cr-YAG Q-switch.

42. The handheld LIBS device of claim 38 in which the laser assembly housing further includes therein a detector for detecting when the laser assembly pulses.

* * * * *